Jan. 28, 1930.　　　O. J. ANTONELLI　　　1,744,716
HEATING DEVICE
Filed Jan. 21, 1926　　　3 Sheets-Sheet 1
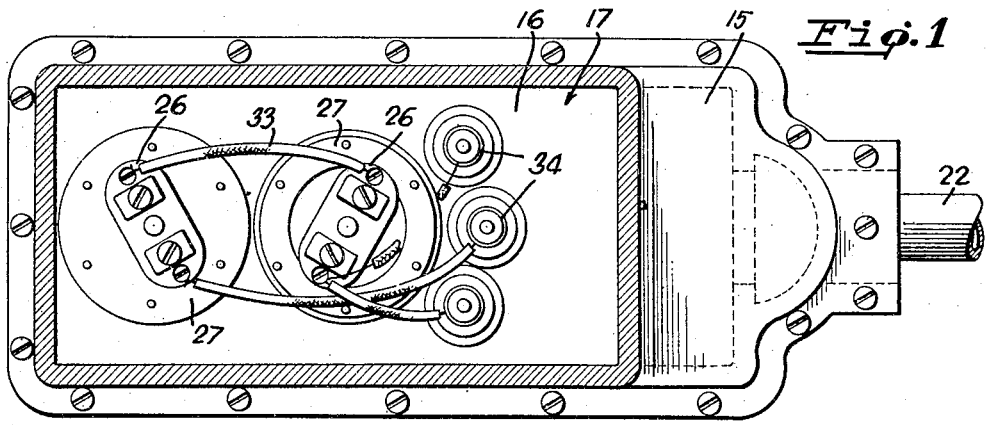
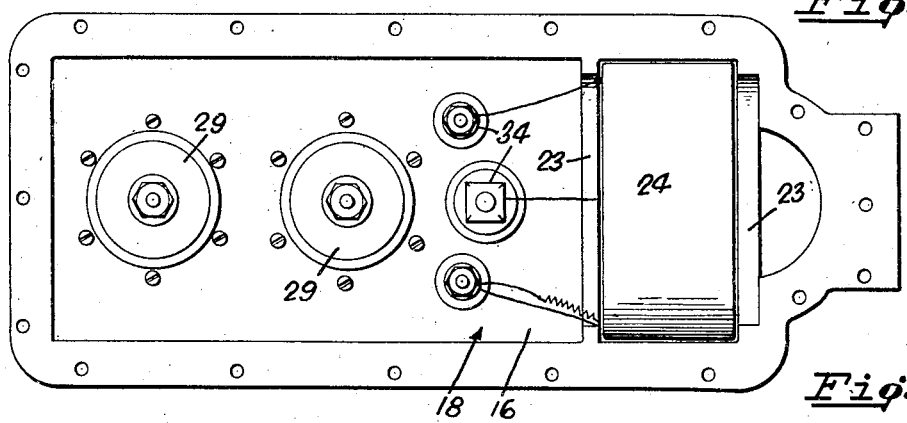
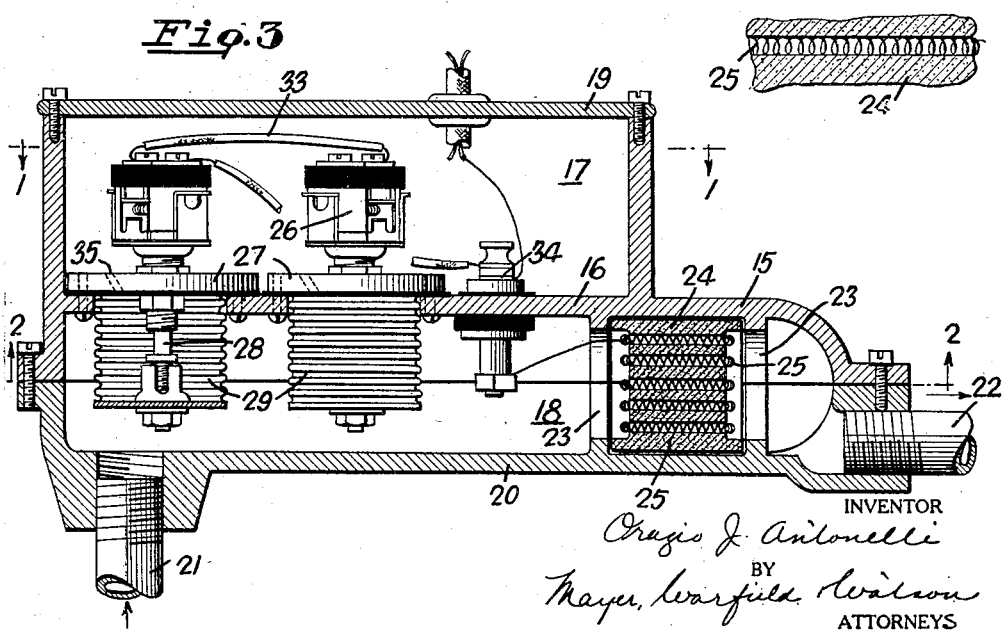
INVENTOR
Orazio J. Antonelli
BY
Mayer, Warfield & Watson
ATTORNEYS Jan. 28, 1930.  O. J. ANTONELLI  1,744,716
HEATING DEVICE
Filed Jan. 21, 1926   3 Sheets-Sheet 2
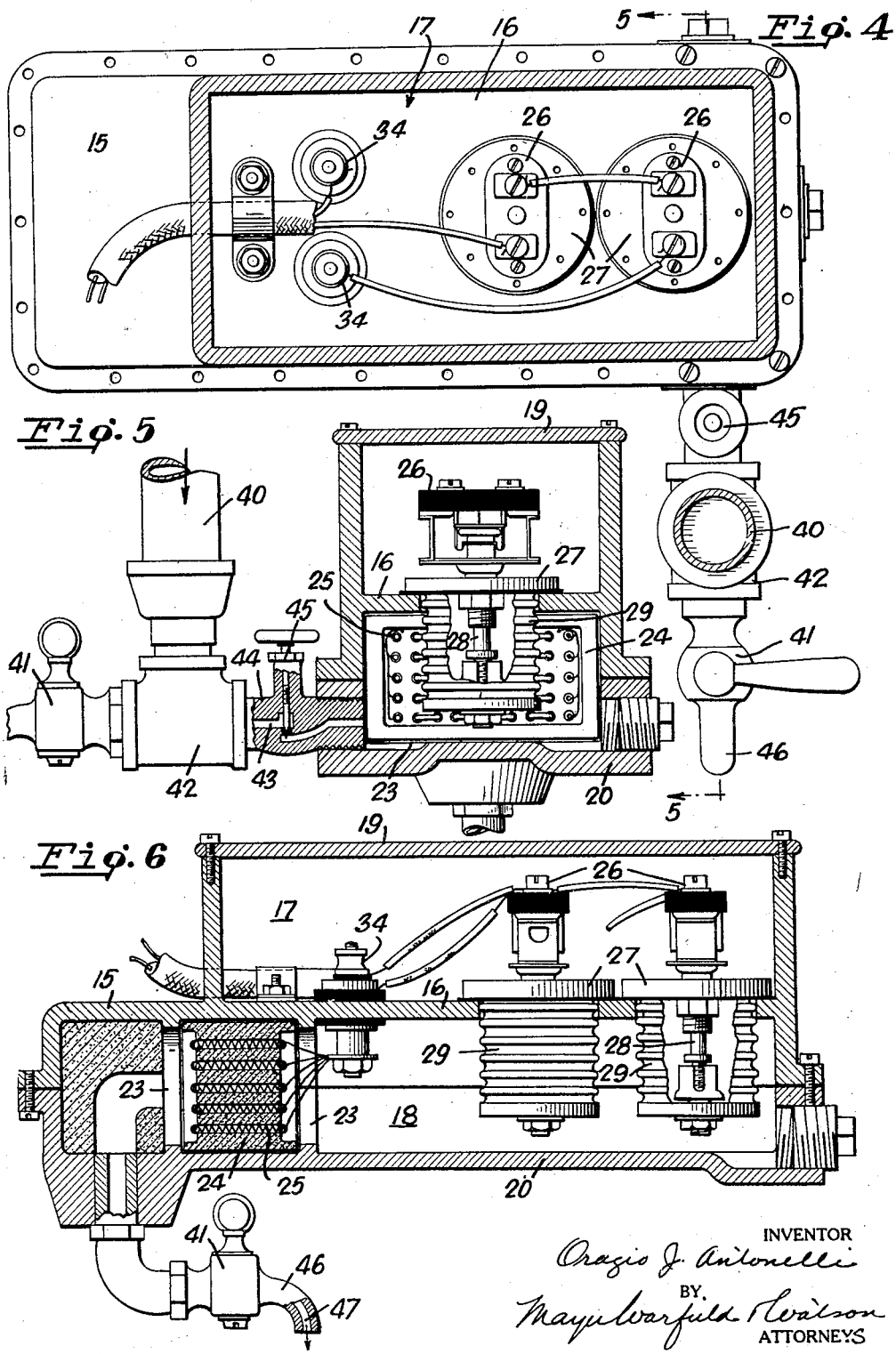

Jan. 28, 1930.  O. J. ANTONELLI  1,744,716
HEATING DEVICE
Filed Jan. 21, 1926   3 Sheets-Sheet 3
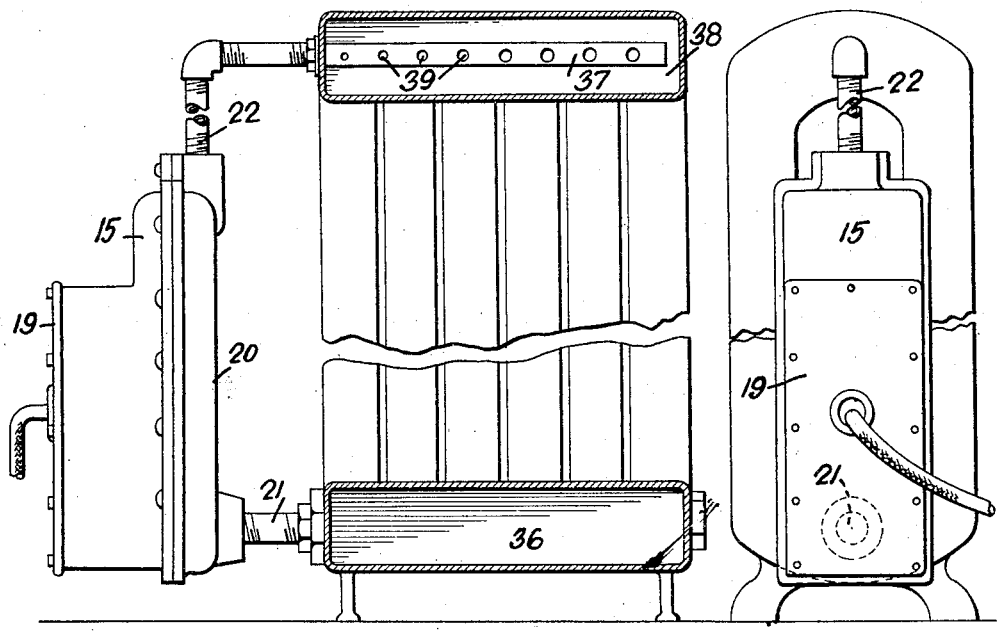
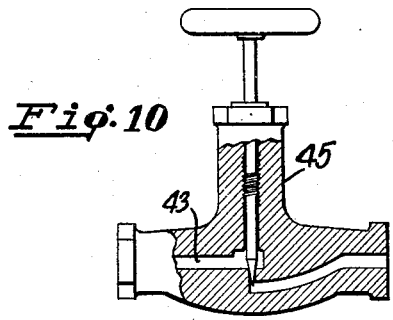
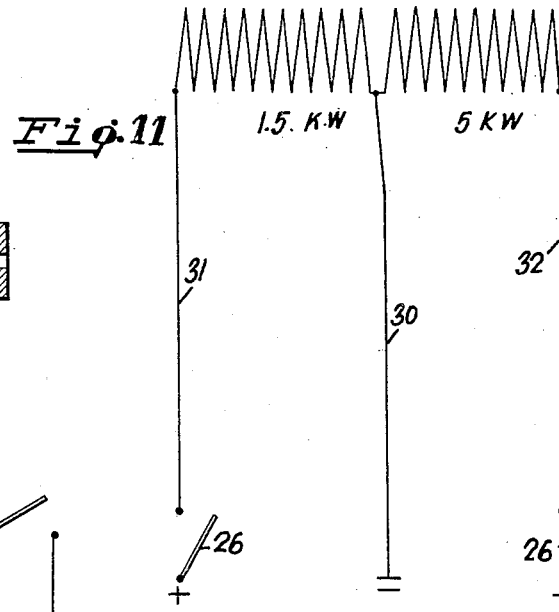
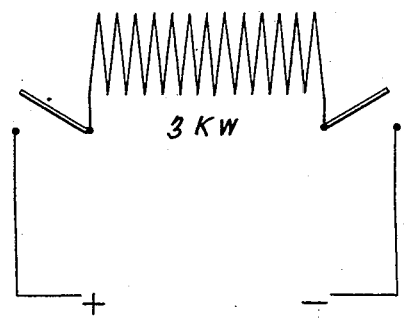
INVENTOR
Orazio J. Antonelli
BY
Mayer, Warfield & Watson
ATTORNEYS Patented Jan. 28, 1930

1,744,716

UNITED STATES PATENT OFFICE

ORAZIO J. ANTONELLI, OF FALL RIVER, MASSACHUSETTS

HEATING DEVICE

Application filed January 21, 1926. Serial No. 82,644.

This invention relates to an electric fluid heater of improved construction.

One of the objects is that of constructing a device of this character which will heat fluid, and particularly water, in a rapid and economical manner.

It is a further object to furnish such a device which will function in a dependable manner so that the persons using the same will be virtually free from the likelihood of injury.

Another object is that of providing a heater which will efficiently perform the purposes for which it is intended and the parts of which may be readily manufactured and assembled, these parts being of relatively simple construction and being capable of being manufactured at a comparatively low cost, aside from the fact that when once assembled they will function in a satisfactory manner over long periods of time.

Other objects of the invention will in part be obvious and will in part appear hereinafter.

The invention accordingly comprises the features of construction, combination of elements and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawings, in which:

Figure 1 is a sectional plan view of one type of heater embodying the subject matter of the present invention, this view being taken along the lines 1—1 and in the direction of the arrows of Fig. 3;

Fig. 2 is a bottom plan view taken along the lines 2—2 and in the direction of the arrows of Fig. 3;

Fig. 3 is a sectional side view of the device;

Fig. 4 is a view corresponding to Fig. 1, but showing a different form of heater;

Fig. 5 is a transverse sectional view taken along the lines 5—5 and in the direction of the arrows of Fig. 4;

Fig. 6 is a sectional side view of the device as shown in Figs. 4 and 5;

Fig. 7 is an enlarged fragmentary sectional view of a detail of the heating unit;

Fig. 8 is a side elevation of a heater of the nature shown in Figs. 1, 2 and 3, and illustrating the same in association with a radiator;

Fig. 9 is an end view of the apparatus as shown in Fig. 8;

Fig. 10 is a sectional side view of a valve such as may be employed in connection with a heater of the nature shown in Figs. 4, 5 and 6; and Figs. 11 and 12 are diagrammatic views of the circuits embodied in the two forms of heaters shown in the preceding views.

Heaters of the nature contemplated in this invention may be employed for numerous different purposes. For the sake of illustration, however, the forms of heaters shown in the drawings are, first, a heater of particular value when employed in connection with radiators, and, secondly, a heater which will supply hot water for domestic and commercial purposes.

In the drawings, the numeral 15 indicates a casing which is formed with an interior partition 16 dividing this casing into compartments 17 and 18, the first being hereinafter termed the control compartment, while the latter will be referred to as the fluid compartment. The control compartment is closed by a plate 19 suitably secured to the casing 15, and the fluid compartment is closed by a cover 20 which is complementary to that portion of the casing 15 which in itself forms a portion of the fluid compartment.

Fluid may enter the compartment 18 through a pipe 21 and may escape therefrom through a pipe 22. Within this compartment, and forming portions of the casing and cover, are pairs of spaced flanges 23, between which a heating unit or block is arranged. This member includes a body 24 formed with a series of longitudinally-extending perforations. The material of which the body thereof is composed is preferably of an insulating and fluid-resistant character, and arranged within the perforations or bores aforementioned are the coils 25 of a resistance unit. The wire of which this unit is formed should be of that nature which will embrace wear-resistant qualities and possess the faculty of giving off a maximum amount of heat with a minimum of current consumption, the wire being preferably enameled or glass-covered so that all portions thereof will be insulated from other portions.

Due to the provision of the flanges 23 the fluid in its passage through the compartment 18 and from the tube 21 to the tube 22 must necessarily pass through the bores of the heating unit, and particularly the bores of the coils of resistance wire arranged within the bores of the body 24, in that the fluid cannot pass between this body and the inner casing face. Due to the fact that the spaces through which the fluid must pass are relatively greatly constricted and highly heated, it will be obvious that the fluid will be highly heated in its passage if the heating unit is energized in a manner hereinafter described, and thus the fluid passing into the tube 22 will have its temperature raised to a maximum extent.

In the present embodiments of the invention the control compartment houses switches 26 of the "quick-throw" and minimum-arcing type. These switches are mounted upon plates 27, which close openings provided in the partition member 16. The functioning of the switches is controlled by actuating members 28, which extend through the plates 27 and into bellows members 29, which may be formed of flexible corrugated metal, the actuating members being suitably connected therewith, for example, in the manner shown.

With particular reference to the form of heater shown in Figs. 1, 2 and 3, and the wiring diagram illustrated in Fig. 11, it will be understood that the resistance forming a part of the heating unit is divided into two groups, the first in the illustrated embodiment having a current consumption of 1.5 kw., while the second consumes .5 kw. The inner ends of these groups may be connected by a common lead 30 to one pole of a source of current supply. The outer ends thereof are connected by leads 31 and 32 one to each of the poles of the switches 26. The opposite poles of these switches may be connected by a lead 33 to the pole of the source of current supply opposite from that to which the lead 30 is connected. As a consequence, when both of the switches 26 are closed the entire resistance unit will be operated. When one of the same is open that group of the resistance wire which is connected therewith will become inoperative, and, obviously, if the second switch is open the entire unit will cease to function.

In order to connect the resistance unit which is in the fluid compartment with the mechanism within the control compartment, suitable binding posts 34 may be interposed within the respective leads; these posts passing through openings in the partition 16 and being suitably packed so as to prevent an escape of fluid from the compartment 18 into the compartment 17. It will be noted that in order to permit the bellows members 29 to freely operate, the plates 27 may be formed with openings 35, and these bellows members are of such a nature that they may be adjusted to offer different degrees of resistance to being collapsed, it being understood that at atmospheric pressure both of the switches in the present embodiment will be closed.

Conceding that this unit is connected with the radiator, for example, in the manner shown in Figs. 8 and 9, in which the tube 21 is coupled with the lower radiator head 36, while the tube 22 is extended as at 37 within the upper head 38 of the radiator, and this extension is formed with a series of perforations 39 of increasingly greater area: The cold fluid will enter the pipe 21 and the fluid compartment 18 as soon as the main switch (not shown) which supplies current to the apparatus is closed. This result will obtain under the thermocycle principle, and, obviously, the fluid in its passage through the bores of the heating unit will be highly heated and will be discharged through the extension 27 of the pipe 22 into the upper radiator head. As a consequence, and almost immediately, the upper portion of the radiator will begin to warm and give off heat. The layer of heated fluid within the radiator will be gradually built up until the entire fluid body becomes thoroughly warmed and pressure is generated incident to the fact that a system of the nature shown involves a closed fluid circuit. It is preferred that the bellows member controlling the operation of that switch which is connected with the 1.5 kw. group of the resistance operate (i. e., collapse to a sufficient extent to throw the switch associated therewith) at 10 pounds above atmospheric pressure, and the second switch, i. e., that controlling the operation of the .5 kw. group of resistance, be operated by its associated bellows member at 15 pounds pressure above atmospheric.

As a result, upon the pressure within the radiator reaching a point of 10 pounds above atmospheric, the first of the switches will be thrown to open position, and the current consumption will drop to a corresponding extent. Under mild weather conditions, that portion of the resistance member which still remains operative will continue to raise the temperature, and, consequently, the pressure of the fluid within the system; and upon this pressure reaching a point of 15 pounds the second switch will be thrown, thus entirely disconnecting all parts of the resistance unit from the source of current supply. The fluid within the system will now cease to circulate, and the pressure will begin to drop. At that point for which the operation of the bellows members is set (say, for example, 13 pounds) the switch controlling the .5 kw. portion of the resistance will be closed and the pressure will again be built up.

If the temperature is such that the radiator will give off a relatively great amount of heat it will be understood that the parts will also operate as aforedescribed, but that a pressure of 15 pounds will probably not be reached, and that, accordingly, that switch which controls the .5 kw. group will not be opened. In fact, under severe weather conditions this latter portion of the resistance might be insufficient to maintain the pressure above 10 pounds, under which conditions that switch which controls the 1.5 kw. portion of the resistance would periodically close and open during the continuing operation of the radiator.

In any event, it will be understood that by the use of a mechanism of the nature suggested the temperature of the fluid within the circuit will be raised with maximum rapidity, and this will be particularly true where the heater is connected with the radiator in the manner shown, for the reason, as aforestated, that the upper portion of the radiator will be almost immediately warmed upon the heater beginning its operation, and the radiator will consequently give off heat from the beginning. Furthermore, current consumption will remain at a minimum, and the temperature of the system will be maintained almost constant.

In the form of apparatus shown in Figs. 4, 5 and 6 an intake pipe 40 is provided which may have a faucet-controlled outlet 41. A casing 42 is connected with this pipe and contains a check valve (not shown) of any desirable and trustworthy character. The fluid passes this valve and enters a conduit 43 forming a part of a branch pipe 44 which is connected with the casing 42, and the flow of fluid through this conduit may be controlled by a needle valve 45. The inner end of the conduit 43 is connected with the fluid compartment of the heater, the outlet end of this compartment being connected with a faucet 46 which has a channel 47 of an area in excess of the most constricted portion of the conduit 43 for a purpose hereinafter brought out. The switches 26 within the control compartment are in the present instance, and contrary to the switches in the preceding form of device, normally open. The bellows members are so set and connected with the actuating members of these switches that the first of these members will be operatively collapsed at a pressure of a half pound, and the second of these members will be operatively collapsed at a pressure of five pounds above atmospheric, under which conditions both switches will be opened. In this form of device the resistance unit includes a single group of wire of, for example, 3 kw. capacity, one end of this unit, as in Fig. 12, being directly connected to one of the poles of the "half-pound" switch, and the other terminal of this unit being connected to one of the poles of the "five-pound" switch. The opposite poles of these two switches are connected with a suitable source of current supply, and as a consequence, it will be understood that with the fluid in the compartment 18 at substantially atmospheric pressure the resistance unit will operate.

This type of heater, as previously brought out, is of particular value for the direct heating of water for domestic and commercial purposes. Presuming that the faucet 46 is closed and that the pipe 40 is connected with a source of water supply, it will be understood that the pressure of the water within the fluid compartment will be in excess of a half pound. As a consequence, the first-named switch will be in open position and the resistance unit will be inoperative. If, as in most installations it will be the case, the normal pressure of the water supply is higher than five pounds, both switches will be open to accomplish this result. Under these conditions, the faucet 41 may be opened to draw cold water without this operation causing any relief of the pressure within the fluid compartment, due to the provision of the checkvalve within the casing 42, which will prevent this occurring. If now the faucet 46 is opened it will be understood that the pressure within the fluid compartment will be relieved, this being particularly true for the reason that, as aforestated, the passage 47 is of greater area than the most constricted portion of the conduit or passage 43, and, consequently, the pressure of the supply line cannot be maintained within this compartment. As a result, the switches will be closed, and the resistance unit will be energized, causing a heating of the water in its passage to the faucet 46, this heating being instantaneous and to a high degree due to the structure of the heating unit proper. Immediately subsequently to the closing of the faucet 46 the pressure within the fluid compartment will be built up by the continued flow of fluid into the same through the passage 43, and one or both switches will be thrown to open position.

Conceding that the pressure entering through the passage 43 might not even be equal to a half pound above atmospheric, it will be understood that the heater will continue to function. As a consequence, the temperature of the fluid body within the compartment will be raised, and the pressure of this fluid will be increased immediately above a half pound, which will serve to open the first of the switches. If the latter should at any time not open at the proper pressure incident to mechanical failure, it will be understood that a pressure of five pounds will be quickly reached, resulting in the throwing of the second switch, thus opening the circuit and discontinuing the operation of the resistance unit. Likewise, if water should fail to enter the pipe 40, that body of water which remained within the fluid compartment would be immediately heated to an extent serving to increase the pressure to a point at which the switch or switches would operate, this being true even if the checkvalve within the casing 42 did not seat perfectly and permitted a slow escape of the pressure. It will of course be understood that the passage 43 is preferably located in a plane above that occupied by the outlet so as to avoid all possibility of the fluid trickling past the checkvalve into the pipe 40 in the event of failure of pressure.

In both forms of the device it is preferred that a suitable fuse (not shown) be interposed in one of the current supply lines, which fuse would burn out prior to the resistances becoming injured in the event of a failure of fluid within the compartments. It will also be appreciated that due to the fact that the heating unit per se preferably takes the form of a body having numerous perforations or bores, within which coils of wire are positioned, the temperature of the fluid will be quickly raised incident to this direct contact. Even if the fluid within the compartments 18 should have electrolytic properties, the danger of short-circuiting will be prevented for the reason that the wire of the resistance unit is preferably glazed or enameled, as aforestated, in order to prevent this occurrence.

Thus, among others, the objects of this invention have been accomplished, and since certain changes may be made in the above construction, and different embodiments of the invention could be made, without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

Having described my invention, what I claim as new and desire to secure by Letters Patent is:

1. A heater, comprising a casing providing a fluid compartment formed with intake and outlet openings, an electrical heating unit within said compartment, a pair of switches connected with a source of current supply and with said heating unit, and pressure-responsive devices operatively connected with said compartment and said switches for controlling the functioning of the latter, said devices being set to operate said switches at different pressures.

2. A heater, including a casing providing a compartment having intake and outlet openings, an electrical heating unit within said compartment and comprising two groups of resistance wire, a pair of switches connected with a source of electrical current supply and one with each of said groups, and pressure-responsive devices set to function at different pressures and operatively connected with said compartment and said switches for controlling the functioning of the latter.

3. A heater, including a casing providing a fluid compartment having intake and outlet openings, an electrical heating unit comprising a length of resistance wire arranged within said compartment, a pair of switches connected in series with said wire and a source of electrical current supply, and pressure-responsive devices operatively connected with said compartment and said switches for controlling automatically the functioning of said unit, said devices being set to operate at different pressures.

4. An electrical heater, including a casing formed with intake and outlet openings, a block of insulating material arranged to extend across said casing and being formed with a plurality of relatively restricted bores extending to permit direct passage of fluid through the casing, a resistance element disposed within said bores and arranged in the form of a coil to further restrict the openings of the latter, a switch controlling a portion of said resistance element, a second switch controlling a second portion of such element, and pressure-responsive devices for operating said switches and extending into said casing, said devices having different operating pressures.

5. In combination, a radiator provided with an upper head, a heater comprising a casing providing a fluid compartment formed with intake and outlet openings, the former being connected with said radiator, a tube extending from the latter into the head of said radiator and having openings of increasing area, a heating unit within said casing, and means also within said casing and responsive to the pressure within the same for controlling the energization of said heater.

6. A heating device including a radiator and a conduit connected together to provide a closed circuit for a body of fluid, a plurality of electrical resistance units within said circuit and adjacent which said fluid passes to be heated thereby, switches connected one to each of said units and pressure responsive devices to be acted upon by the fluid within said circuit and connected one to each of said switches, said pressure responsive devices being set one to operate to open the switch with which it is connected upon the fluid within the circuit reaching a substantially predetermined temperature and resultant pressure, another of said pressure responsive devices being set to open the switch with which it is connected when said fluid reaches a higher temperature and consequently has a greater pressure.

7. A fluid heating device including means providing a conduit for the passage of fluid to be heated, a plurality of resistance units disposed within said conduit and to heat the fluid passing therethrough, a plurality of normally closed switches connected one to each of said units, means for opening one of said switches when the fluid reaches a substantially predetermined temperature and means connected with another of said switches to also open the same when the temperature of said fluid increases beyond a predetermined degree in excess of that under which the operation of the first switch follows.

8. A heating device for fluid including a conduit for the passage of fluid to be heated, resistance units disposed within said conduit to heat the fluid passing therethrough, normally closed switches connected one to each of said units, a pressure responsive device connected with the interior of said conduit and set to operate and open the switch with which it is associated upon the pressure of the fluid reaching a substantially predetermined point and means connected with another of said switches to open the same upon the fluid pressure increasing to a substantially predetermined point above the pressure at which said first means operated.

In testimony whereof I affix my signature.

ORAZIO J. ANTONELLI.